(12) United States Patent
Song et al.

(10) Patent No.: US 11,999,432 B2
(45) Date of Patent: Jun. 4, 2024

(54) PERSONAL MOBILITY

(71) Applicants: Hyundai Motor Company, Seoul (KR); Kia Corporation, Seoul (KR)

(72) Inventors: Ilsun Song, Seongnam-si (KR); Donghee Seok, Suwon-si (KR); Juyoung Oh, Seoul (KR); Duck Young Kim, Seongnam-si (KR); Hee Jin Ro, Seoul (KR); Yocheol Jang, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 333 days.

(21) Appl. No.: 17/510,619

(22) Filed: Oct. 26, 2021

(65) Prior Publication Data

US 2022/0234675 A1    Jul. 28, 2022

(30) Foreign Application Priority Data

Jan. 26, 2021    (KR) .......................... 10-2021-0010677

(51) Int. Cl.
| | | |
|---|---|---|
| B62K 19/46 | (2006.01) | |
| B62J 7/02 | (2006.01) | |
| B62J 25/04 | (2020.01) | |
| B62K 21/00 | (2006.01) | |

(52) U.S. Cl.
CPC ................. *B62K 19/46* (2013.01); *B62J 7/02* (2013.01); *B62J 25/04* (2020.02); *B62K 21/00* (2013.01)

(58) Field of Classification Search
CPC .. B62K 19/46; B62K 21/00; B62J 7/02; B62J 7/04; B62J 7/08
See application file for complete search history.

(56) References Cited

U.S. PATENT DOCUMENTS

| | | | |
|---|---|---|---|
| 2017/0073032 A1* | 3/2017 | Mei ........................ | B62K 21/12 |
| 2018/0037288 A1* | 2/2018 | Bang ....................... | B62M 6/90 |
| 2018/0194422 A1* | 7/2018 | Christen ................ | B62K 13/00 |
| 2020/0039552 A1* | 2/2020 | Trebtoske ............... | B62B 5/067 |
| 2020/0047840 A1* | 2/2020 | Newby ................... | B62K 21/12 |
| 2022/0144360 A1* | 5/2022 | Jang ....................... | B62K 23/02 |
| 2022/0161887 A1* | 5/2022 | An ......................... | B62K 15/00 |
| 2022/0185402 A1* | 6/2022 | Kim ....................... | B62K 5/025 |
| 2022/0371680 A1* | 11/2022 | Jodha ..................... | B62J 11/05 |

FOREIGN PATENT DOCUMENTS

| | | |
|---|---|---|
| CN | 2871339 Y | 2/2007 |
| CN | 105946938 B | 2/2018 |
| JP | 2007203792 A | 8/2007 |
| KR | 200236701 Y1 | 10/2001 |
| KR | 101352054 B1 | 1/2014 |
| KR | 102122228 B1 | 6/2020 |

* cited by examiner

Primary Examiner — Brian L Swenson
(74) Attorney, Agent, or Firm — Slater Matsil, LLP

(57) ABSTRACT

An embodiment personal mobility includes a main body including a footrest on an upper surface of the main body, a steering device provided in front of the main body, a front wheel installed at a lower end of the steering device, a rear wheel installed at a rear end of the main body, and a cargo loading unit configured to be unfolded in a lateral direction from opposite sides of the main body to expand a loading region for loading a cargo in an unfolded state and configured to be folded toward the main body in a folded state.

17 Claims, 9 Drawing Sheets

PERSONAL MOBILITY

CROSS-REFERENCE TO RELATED APPLICATIONS

This application claims the benefit of Korean Patent Application No. 10-2021-001067, filed on Jan. 26, 2021, which application is hereby incorporated herein by reference.

TECHNICAL FIELD

The disclosure relates to a personal mobility.

BACKGROUND

As used throughout this disclosure, the phrase "personal mobility" is intended to mean any moving personal vehicle, device, machine, instrument, apparatus, or the like. Recently, the use and distribution of a personal mobility such as an electric kickboard is expanding. The personal mobility may be driven on roadways, sidewalks, narrow alleys, and the like by electric power, and may be used as a means of transportation for moving a short distance or for leisure.

A conventional personal mobility of an electric kickboard type includes a main body provided with a footrest on which a user may stand, a steering device provided in front of the main body, a front wheel installed on a lower end of the steering device, and a rear wheel installed on a rear end of the main body.

Although it is not difficult for the user to ride and drive such a personal mobility, when a cargo is loaded on the personal mobility, it is difficult for the user to maintain balance, so that the driving may become unstable. In addition, it is difficult to stably load a cargo in such a personal mobility because a width of the footrest is narrow.

SUMMARY

The disclosure relates to a personal mobility. Particular embodiments relate to a personal mobility having two front wheels whose interval in a width direction may be adjusted and which is capable of driving stably in a state in which a cargo is loaded.

An embodiment of the disclosure provides a personal mobility capable of driving stably in a state in which a cargo is loaded.

Additional embodiments of the disclosure will be set forth in part in the description which follows and, in part, will be obvious from the description, or may be learned by practice of the disclosure.

In accordance with an embodiment of the disclosure, a personal mobility includes a main body provided with a footrest on an upper surface thereof, a steering device provided in front of the main body, a front wheel installed at a lower end of the steering device, a rear wheel installed at the rear of the main body, and a cargo loading unit capable of being unfolded in a lateral direction from opposite sides of the main body to expand a loading region for loading a cargo and capable of being folded toward the main body.

The cargo loading unit may include a plurality of expansion members having one end rotatably connected to a side surface of the main body to be unfolded in the lateral direction of the main body by rotating and disposed to be spaced apart from each other in a longitudinal direction of the main body.

The cargo loading unit may further include a stopper provided to be unfolded to protrude upward from a free end of each of the expansion members or to be folded to be accommodated in each of the expansion members.

The cargo loading unit may further include a plurality of width expansion parts slidably coupled to the plurality of expansion members, respectively, to expand a width of the expansion member in a state in which the expansion member is unfolded in the lateral direction of the main body.

The main body may include a plurality of accommodating grooves provided on opposite sides of the main body to accommodate each of the expansion members.

Each of the expansion members may include a magnet provided to be attached to the main body when folded toward the main body.

The cargo loading unit may include a plurality of expansion plates rotatably connected to opposite side ends of the main body and provided to be folded by rotating from the opposite sides of the main body to cover an upper surface of the main body or to be unfolded by rotating from the opposite sides of the main body.

Each of the expansion plates may include a stopper provided to protrude upward from a free end thereof in a state of being unfolded from the opposite sides of the main body, and the main body may include a stopper accommodating groove provided to accommodate the stopper in a state in which each of the expansion plates is folded.

The main body may include an expansion plate loading surface provided lower than the footrest in a region where the expansion plates are placed so that surfaces of the expansion plates and a surface of the footrest are maintained at the same height in the state in which the expansion plates are folded.

The cargo loading unit may include a plurality of sliding expansion units provided to be unfolded in a sliding manner from the opposite sides of the main body in a lateral direction.

The front wheel may include a first front wheel and a second front wheel installed side by side in a state in which rotation centers thereof coincide and capable of approaching or being separated from each other in a width direction.

The steering device may include a steering shaft rotatably installed on the main body, and a wheel support device installed below the steering shaft to support the first front wheel and the second front wheel and capable of adjusting an interval between the first front wheel and the second front wheel.

The wheel support device may include a sliding block coupled to a lower end of the steering shaft, a first sliding member and a second sliding member coupled to the sliding block to move in the width direction of the front wheel and provided to move oppositely to opposite sides from the sliding block, a first wheel support member provided to support the first front wheel and coupled to the first sliding member, a second wheel support member provided to support the second front wheel and coupled to the second sliding member, and a wheel interval adjusting device provided to move the first wheel support member and the second wheel support member to adjust the interval between the first front wheel and the second front wheel.

The wheel interval adjusting device may include a first screw shaft fastened to the first wheel support member, a second screw shaft fastened to the second wheel support member and provided such that a spiral direction thereof is opposite to that of the first screw shaft, and a driving unit provided to simultaneously rotate the first screw shaft and the second screw shaft.

In accordance with another embodiment of the disclosure, a personal mobility includes a main body provided with a footrest on an upper surface thereof, a steering device provided in front of the main body, a first front wheel and a second front wheel installed at a lower end of the steering device and capable of approaching or being separated from each other, and a rear wheel installed at the rear of the main body, wherein the steering device includes a steering shaft rotatably installed on the main body, and a wheel support device installed below the steering shaft to support the first front wheel and the second front wheel and capable of adjusting an interval between the first front wheel and the second front wheel.

BRIEF DESCRIPTION OF THE DRAWINGS

These and/or other embodiments of the disclosure will become apparent and more readily appreciated from the following description of exemplary embodiments, taken in conjunction with the accompanying drawings, in which:

FIGS. 6 to 8 illustrate a modified example of the cargo loading unit of the personal mobility according to an embodiment of the disclosure, wherein FIG. 6 is a perspective view illustrating a state in which a plurality of expansion plates is folded, FIG. 7 is a cross-sectional view taken along line A-A' in FIG. 6, and FIG. 7 is a perspective view illustrating a state in which the plurality of expansion plates is unfolded.

DETAILED DESCRIPTION OF ILLUSTRATIVE EMBODIMENTS

Hereinafter, embodiments of the disclosure will be described in detail with reference to the accompanying drawings. The embodiments described below are provided by way of example so that those skilled in the art will be able to fully understand the spirit of the disclosure. The disclosure is not limited to the embodiments described below, but may be embodied in other forms. In order to clearly explain the disclosure, parts not related to the description are omitted from the drawings, and the size of the components may be exaggerated for convenience.

Figure 1:
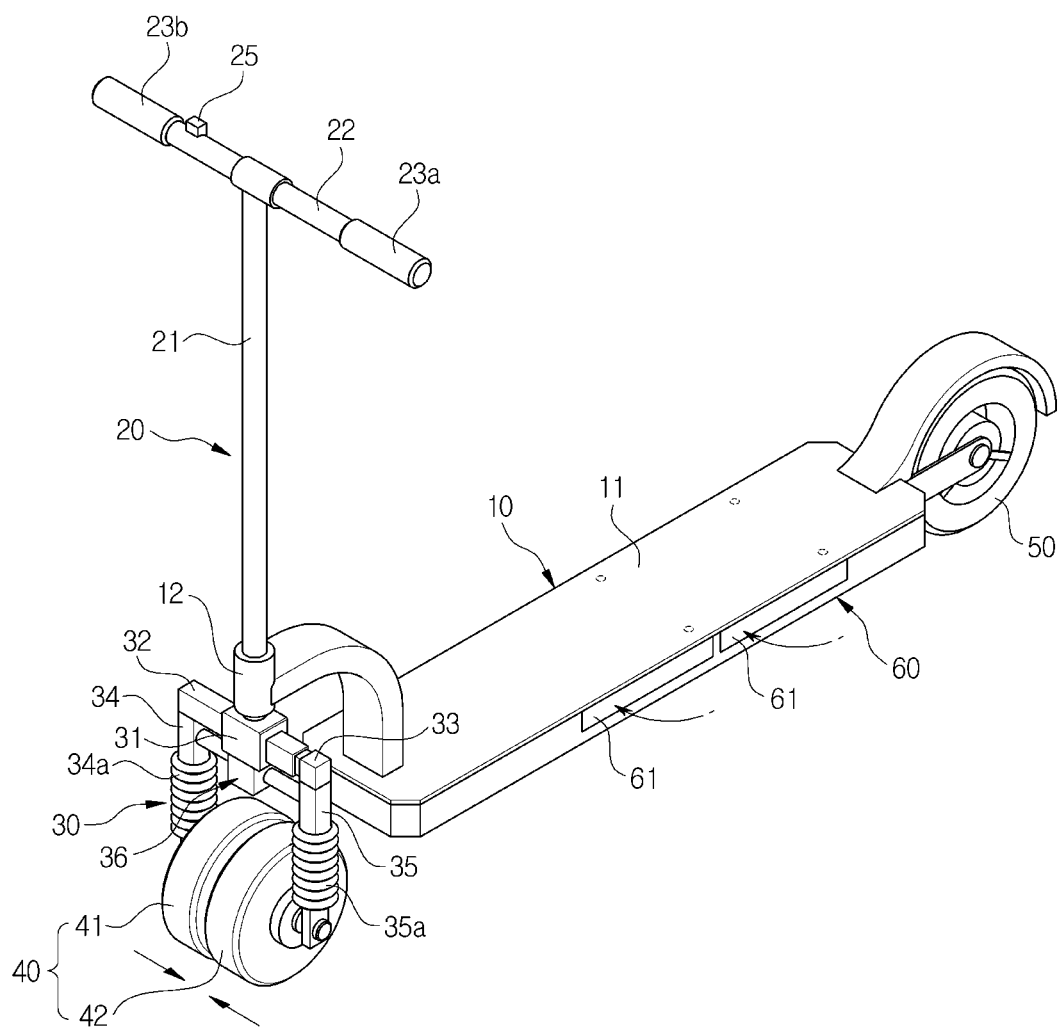
FIG. 1 is a perspective view of a personal mobility according to an embodiment of the disclosure in a state in which a first front wheel and a second front wheel approach and a cargo loading unit is folded.
Figure 2:
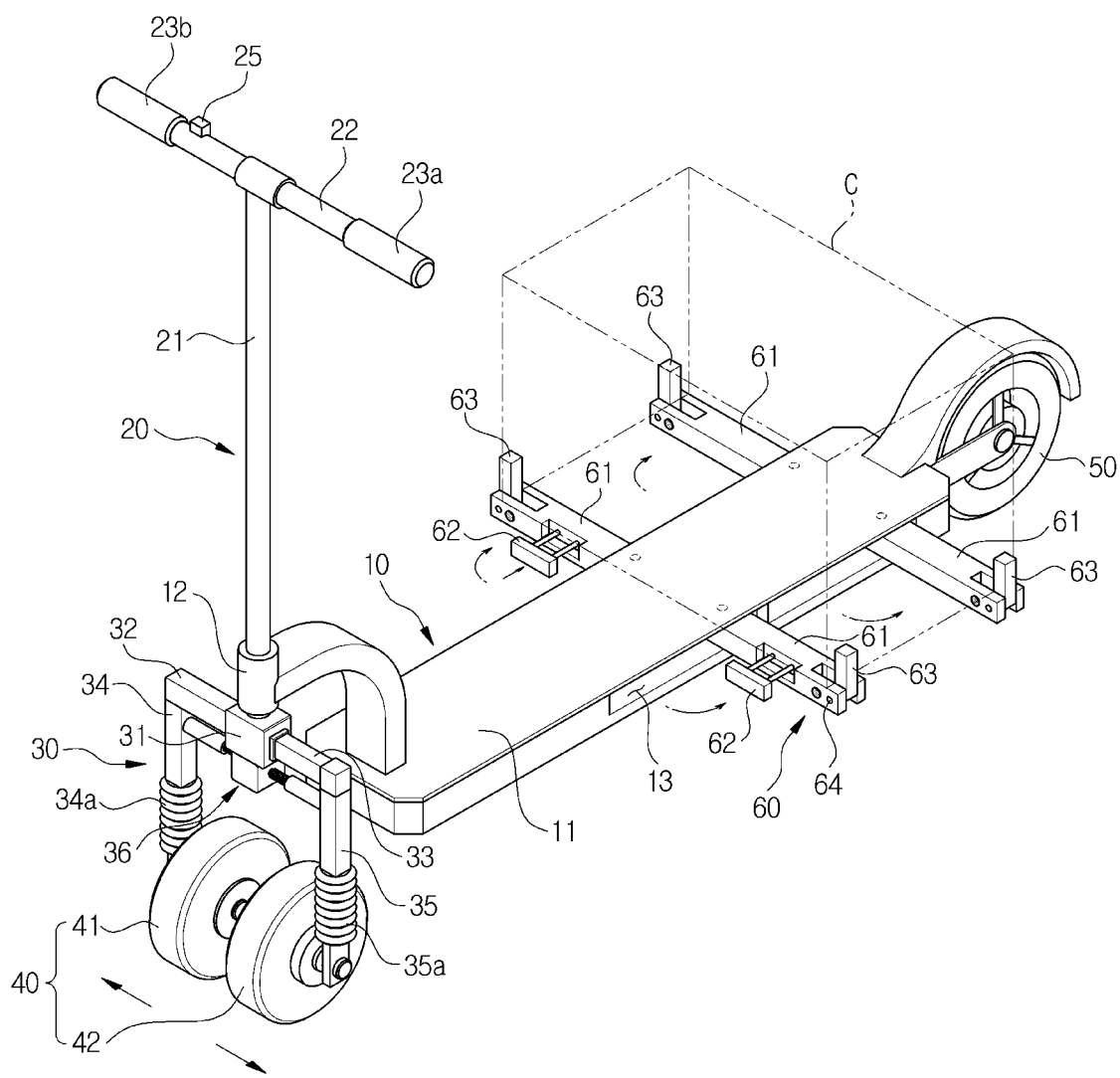
FIG. 2 is a perspective view of the personal mobility according to an embodiment of the disclosure in a state in which the first front wheel and the second front wheel are spaced apart from each other and the cargo loading unit is unfolded.

As illustrated in FIGS. 1 and 2, a personal mobility according to an embodiment of the disclosure may include a main body 10 provided with a footrest 11 on an upper surface thereof, a steering device 20 provided in front of the main body 10, a front wheel 40 installed on a lower end of the steering device 20, a rear wheel 50 installed on a rear end of the main body 10, and a cargo loading unit 60 provided at a rear portion of the main body 10.

The front wheel 40 includes a first front wheel 41 and a second front wheel 42 installed side by side in a state in which rotation centers thereof coincide and capable of approaching or being separated from each other in a width direction. The first front wheel 41, the second front wheel 42, and the rear wheel 50 may include a braking device for braking, and the rear wheel 50 may include a driving motor for driving. The main body 10 may include a battery for supplying power to the driving motor of the rear wheel 50.

The steering device 20 includes a steering shaft 21 rotatably installed on a shaft support 12 provided at a front end of the main body 10, a handle bar 22 installed on an upper end of the steering shaft 21 and extending in opposite sides from the steering shaft 21, and two handles 23a and 23b installed on opposite ends of the handle bar 22, respectively.

Figure 3:
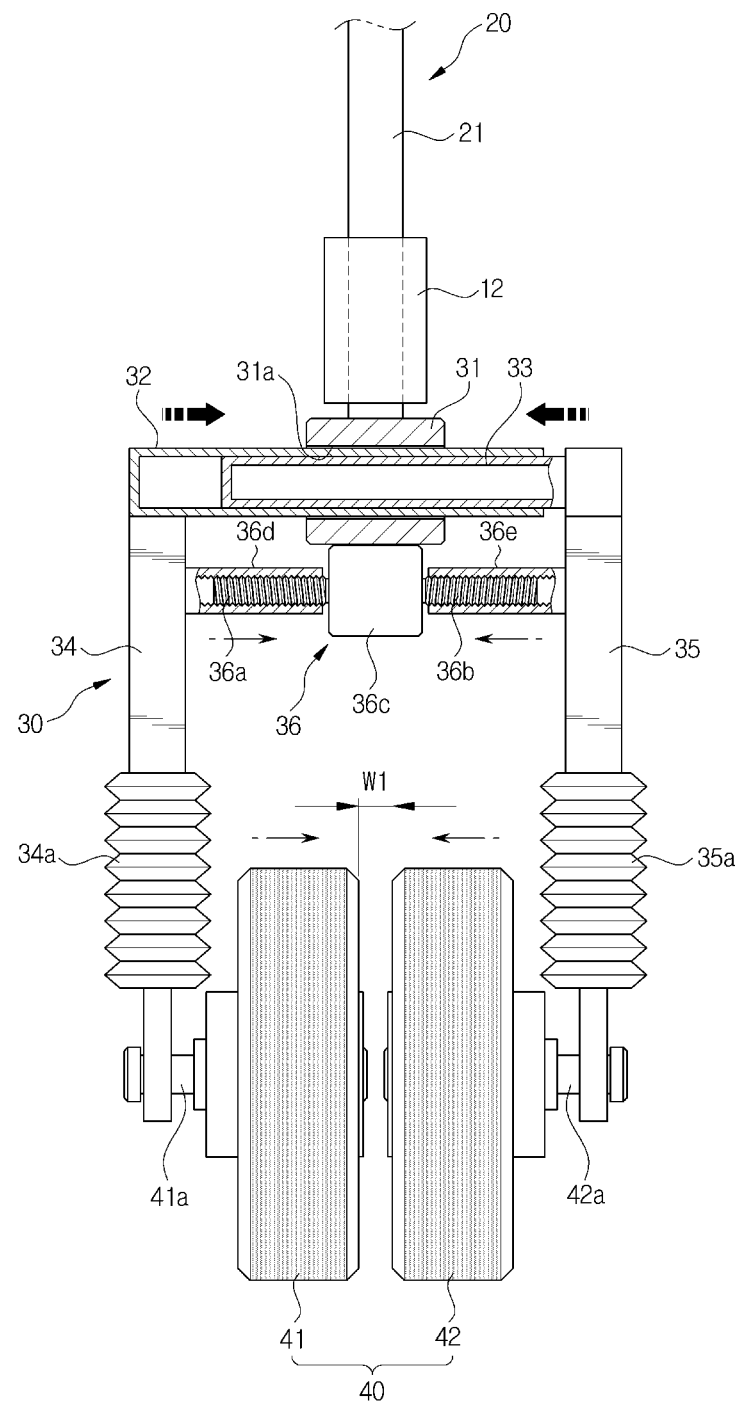
FIG. 3 is a view illustrating a wheel support device of the personal mobility according to an embodiment of the disclosure in the state in which the first front wheel and the second front wheel approach.
Figure 4:
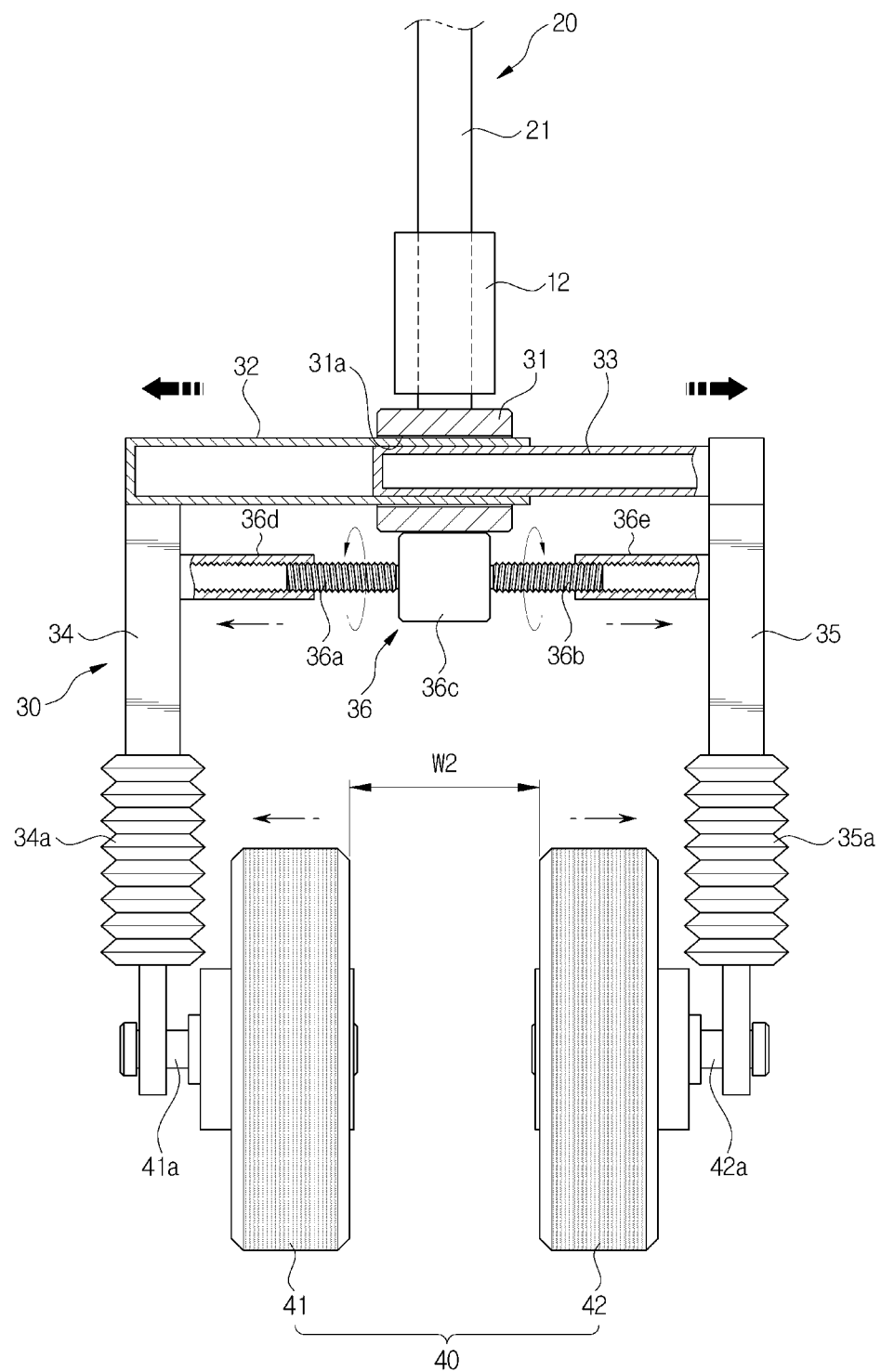
FIG. 4 is a view illustrating the wheel support device of the personal mobility according to an embodiment of the disclosure in the state in which the first front wheel and the second front wheel are spaced apart from each other.

Referring to FIGS. 3 and 4, the steering device 20 includes a wheel support device 30 installed below the steering shaft 21 to support the first front wheel 41 and the second front wheel 42. The wheel support device 30 may support the first front wheel 41 and the second front wheel 42, and at the same time adjust an interval between the first front wheel 41 and the second front wheel 42 as needed. The wheel support device 30 may include a sliding block 31, a first sliding member 32, a second sliding member 33, a first wheel support member 34, a second wheel support member 35, and a wheel interval adjusting device 36.

The sliding block 31 is fixed to a lower end of the steering shaft 21, and includes a rectangular sliding groove 31a to which the first sliding member 32 and the second sliding member 33 are slidably coupled.

The first sliding member 32 may be provided in the form of a square tube, and may move forward and backward in the width direction of the first front wheel 41 in a state of being coupled to the sliding groove 31a of the sliding block 31. The second sliding member 33 may also be provided in the form of a square tube, and may move forward and backward to the opposite side of the first sliding member 32 in a state of being slidably coupled to the inside of the first sliding member 32 coupled to the sliding block 31. By this coupling, the first sliding member 32 and the second sliding member 33 may move forward and backward in the width direction of the first front wheel 41 and the second front wheel 42 in a state in which rotation thereof is restricted, respectively.

The first wheel support member 34 extends downward in a state in which an upper portion thereof is fixed to the first sliding member 32, and a lower portion of the first wheel support member 34 is fixed to a shaft 41a of the first front wheel 41. Accordingly, the first front wheel 41 may move laterally together with the first sliding member 32 and the first wheel support member 34.

The second wheel support member 35 extends downward in a state in which an upper portion thereof is fixed to the second sliding member 33, and a lower portion of the second wheel support member 35 is fixed to a shaft 42a of the second front wheel 42. Accordingly, the second front wheel 42 may also move laterally together with the second sliding member 33 and the second wheel support member 35.

The first wheel support member 34 and the second wheel support member 35 may include shock absorbers 34a and 35a for buffering during driving, respectively.

The wheel interval adjusting device 36 adjusts the interval between the first front wheel 41 and the second front wheel 42 by moving the first wheel support member 34 and the second wheel support member 35 oppositely. The wheel interval adjusting device 36 may include a first screw shaft 36a, a second screw shaft 36b, and a driving unit 36c.

The first screw shaft 36a is fastened to the first wheel support member 34. For the fastening of the first screw shaft 36a, a cylindrical first extension pipe 36d having threads on an inner surface thereof may be installed on the first wheel support member 34.

The second screw shaft 36b is fastened to the second wheel support member 35 and is provided such that a spiral direction thereof is opposite to that of the first screw shaft 36a. For the fastening of the second screw shaft 36b, a cylindrical second extension pipe 36e having threads on an inner surface thereof may be installed on the second wheel support member 35.

The driving unit 36c is fixed to a lower portion of the sliding block 31 and simultaneously rotates the first screw shaft 36a and the second screw shaft 36b disposed on opposite sides thereof in the same direction. Although not shown in the drawings, the driving unit 36c may include a driving motor and a reduction gear device for decelerating and transmitting the rotation of the driving motor to the first and second screw shafts 36a and 36b.

As the first screw shaft 36a and the second screw shaft 36b, whose helical directions are opposite to each other, rotate in the forward or reverse direction at the same time by the operation of the driving unit 36c, the wheel interval adjusting device 36 may simultaneously move the first and second wheel support members 34 and 35 to maintain the first front wheel 41 and the second front wheel 42 with a narrow interval W1 as illustrated in FIG. 3 or to maintain the first front wheel 41 and the second front wheel 42 with a wide interval W2 as illustrated in FIG. 4.

A user may operate the driving unit 36c by manipulating a wheel interval adjusting switch 25 provided on the handle bar 22 of the steering device 20, so that the interval between the first front wheel 41 and the second front wheel 42 may be adjusted as needed. As illustrated in FIG. 2, when a cargo is loaded into the cargo loading unit 60 of the main body 10, for a stable driving, the interval between the first front wheel 41 and the second front wheel 42 may be widened. As illustrated in FIG. 1, when the personal mobility is driven without loading a cargo on the main body 10, the interval between the first front wheel 41 and the second front wheel 42 may be narrowed.

Figure 5:
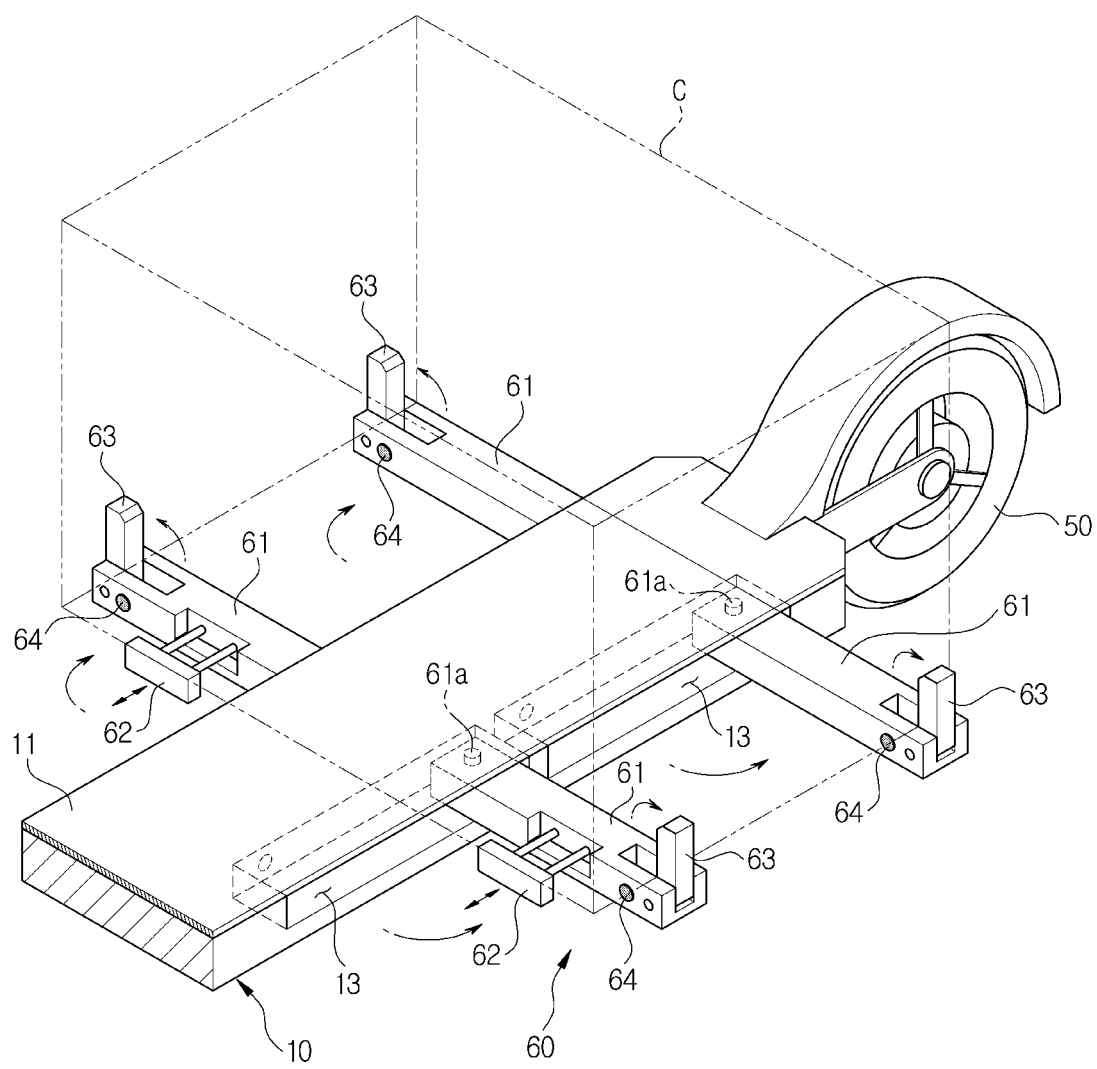
FIG. 5 is a perspective view of a cargo loading unit of the personal mobility according to an embodiment of the disclosure in a state in which a plurality of expansion members is unfolded.

Referring to FIGS. 1, 2, and 5, the cargo loading unit 60 may be unfolded to opposite sides of the main body 10 when a cargo C is loaded at the rear portion of the main body 10 to expand a loading space of the cargo C, and may be folded toward the main body 10 not to protrude from the main body 10 when the cargo C is not loaded.

The cargo loading unit 60 may include a plurality of expansion members 61, a plurality of width expansion parts 62, and a plurality of stoppers 63.

Each of the plurality of expansion members 61 has one end rotatably connected to a side surface of the main body 10 by a connecting shaft 61a, so that each of the plurality of expansion members 61 may be unfolded in a cantilever shape in a lateral direction of the main body 10 by rotating. In addition, the plurality of expansion members 61 is disposed to be spaced apart from each other in a longitudinal direction of the main body 10 and may be symmetrically installed on the opposite sides of the main body 10.

A plurality of accommodating grooves 13 may be formed on the opposite sides of the main body 10 to accommodate the plurality of expansion members 61 when folded, and magnets 64 may be installed on the expansion members 61, respectively, to be attached to the main body 10 in the folded state toward the main body 10.

Each of the width expansion pails 62 is provided on each of the expansion members 61 positioned in front thereof relatively, and may be slidably coupled to each of the expansion members 61. The width expansion part 62 may expand a width of the expansion member 61 by being drawn forward as needed in a state in which the expansion member 61 is unfolded in the lateral direction of the main body 10. When a width of the cargo C is wide, the width expansion part 62 may be drawn out to expand the loading region, when the width of the cargo C is narrow, the width expansion part 62 may be retracted toward the expansion member 61.

Each of the plurality of stoppers 63 is rotatably coupled to a free end of each of the expansion members 61. Each of the plurality of stoppers 63 may be unfolded to protrude upward from the free end of each of the expansion members 61 or may be folded to be accommodated in each of the expansion members 61. Each of the plurality of stoppers 63 may support a lower edge of the cargo C in an unfolded state to prevent the cargo C from being pushed out in the lateral direction.

When the cargo C is loaded on an upper rear side of the main body 10, as illustrated in FIG. 2, the personal mobility may expand the loading region for loading the cargo C by unfolding the plurality of expansion members 61 outward. Therefore, the cargo C, which is larger than the width of the main body 10, may be stably loaded. In addition, when the cargo C is loaded, the interval between the first front wheel 41 and the second front wheel 42 may be widened for stable driving.

When the personal mobility is driven without loading the cargo C, as illustrated in FIG. 1, the expansion members 61 may be folded toward the main body 10 so that the expansion members 61 do not protrude from the main body 10. In addition, the personal mobility may be driven in a state in which the interval between the first front wheel 41 and the second front wheel 42 is narrowed.

Figure 6:
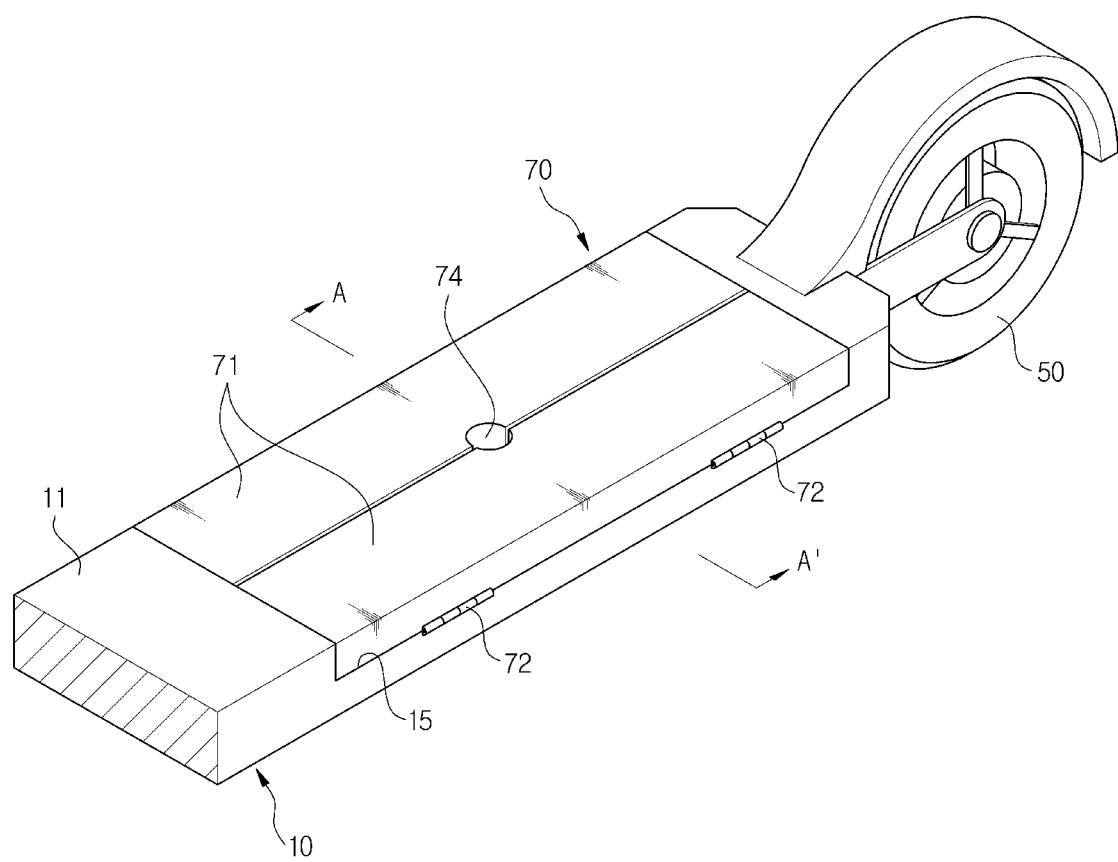
Figure 7:
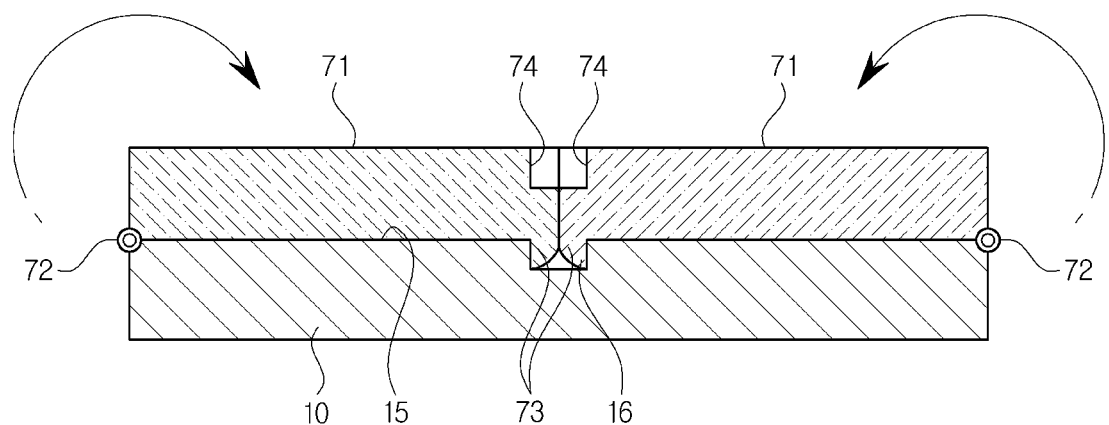
Figure 8:
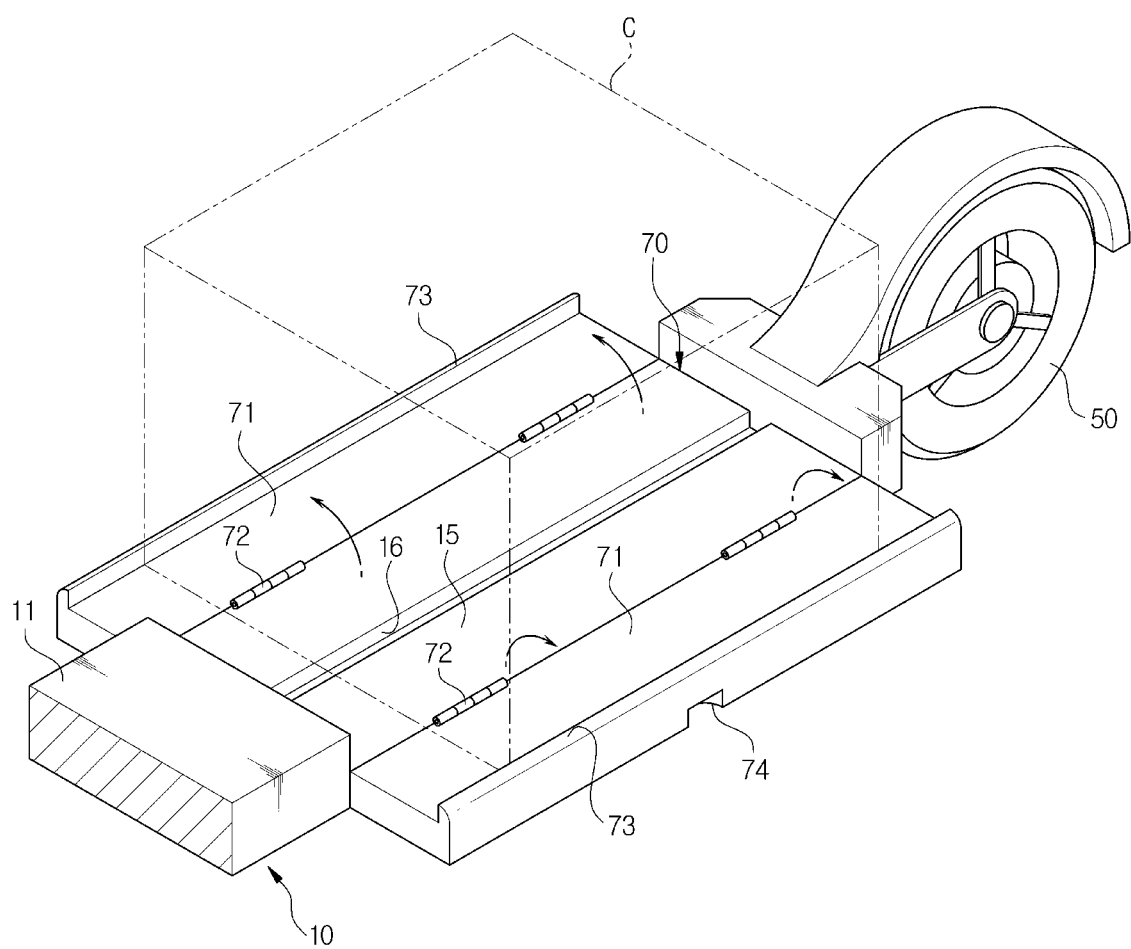

FIGS. 6 to 8 illustrate a cargo loading unit 70 of another form. The cargo loading unit 70 illustrated in FIGS. 6 to 8 includes a plurality of expansion plates 71 rotatably connected to opposite side ends of the main body 10 by hinge devices 72, respectively. The expansion plates 71 may be folded by rotating from the opposite sides of the main body 10 to cover an upper surface of the main body 10 or may expand the loading region for loading the cargo C by rotating in the lateral direction from the opposite sides of the main body 10 to be unfolded.

Each of the expansion plates 71 includes a stopper 73 provided to protrude upward from a free end thereof in a state in which the expansion plate 71 is unfolded in the lateral direction from the opposite sides of the main body 10. The stopper 73 may support the lower edge of the cargo C to prevent the cargo C from being pushed out in the lateral direction.

The main body 10 may include an expansion plate loading surface 15 provided lower than the footrest 11 in a region where the expansion plates 71 are placed so that surfaces of the expansion plates 71 and a surface of the footrest 11 are maintained at the same height in a state in which the expansion plates 71 provided on the opposite sides of the main body 10 are folded, and a stopper accommodating groove 16 formed on the expansion plate loading surface 15 to accommodate the stoppers 73 in the state in which the expansion plates 71 provided on the opposite sides of the main body 10 are folded.

The expansion plates 71 on the opposite sides may each include a groove-shaped handle part 74 to facilitate unfolding in the folded state.

Figure 9:
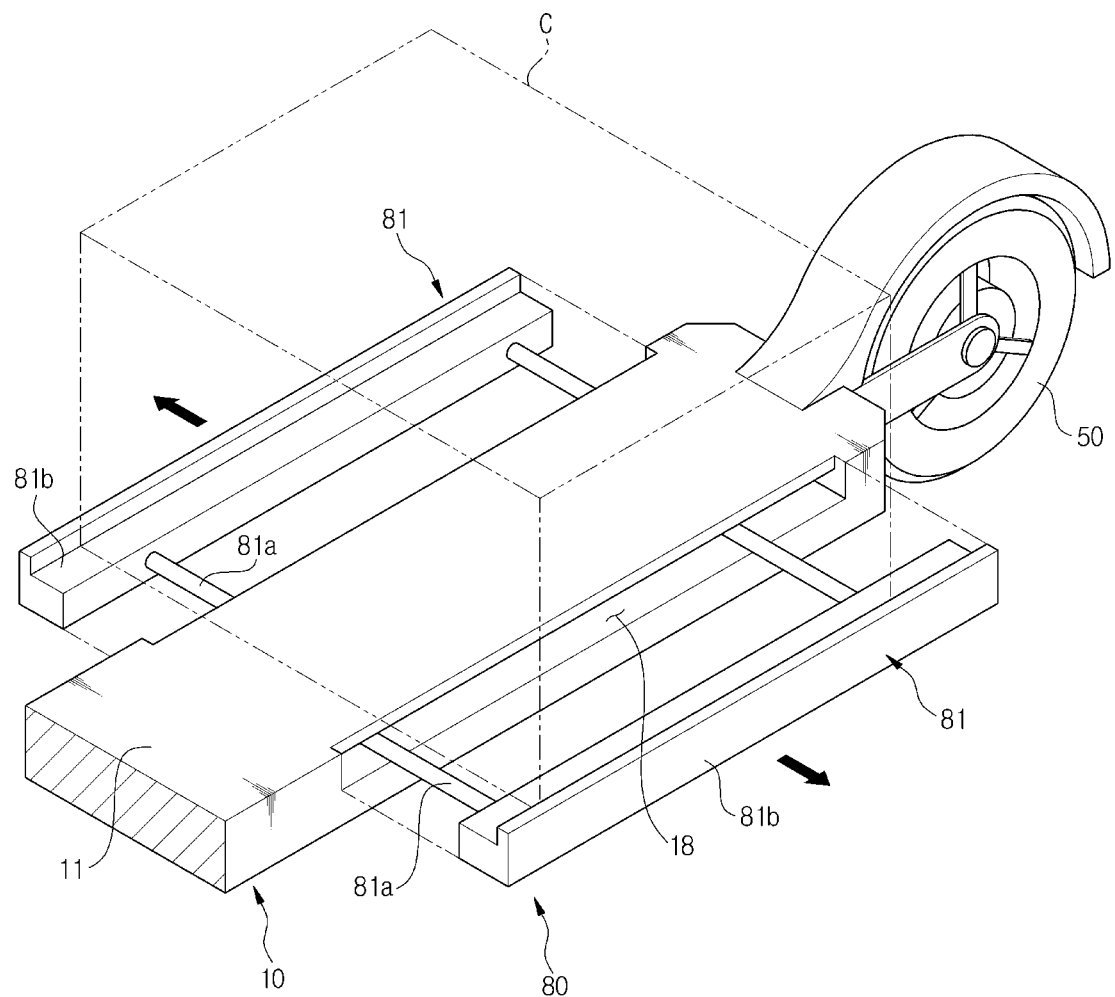
FIG. 9 illustrates the modified example of the cargo loading unit of the personal mobility according to an embodiment of the disclosure in a state in which a plurality of sliding expansion units is unfolded.

FIG. 9 illustrates a cargo loading unit 80 of another form. The cargo loading unit 80 illustrated in FIG. 9 includes a plurality of sliding expansion units 81 unfolded in a sliding manner from the opposite sides of the main body 10 in the lateral direction. Each of the sliding expansion units 81 may include a plurality of sliding members 81a drawn out in the sliding manner from the main body 10 in the lateral direction, and cargo support members 81b, provided at free ends of the plurality of sliding members 81a to support the cargo C.

The cargo loading unit 80 illustrated in FIG. 9 may load the cargo C on an upper surface of the sliding expansion unit 81 by drawing out the sliding expansion unit 81 in the lateral direction when the cargo C is loaded, and may accommodate the sliding expansion unit 81 by pushing the sliding expansion unit 81 toward the side surface of the main body 10 when the cargo C is not loaded. An accommodating groove 18 for accommodating a portion of the cargo support members 81b, may be provided on the side surface of the main body 10.

As is apparent from the above, a personal mobility according to an embodiment of the disclosure can stably load a cargo larger than a width of a main body because a plurality of expansion members can be expanded outward when the cargo is loaded so that a loading region for loading the cargo can be expanded, and can be driven stably because an interval between a first front wheel and a second front wheel can be increased.

What is claimed is:

1. A personal mobility comprising:
   a main body comprising a footrest on an upper surface of the main body;
   a steering device provided in front of the main body;
   a front wheel installed at a lower end of the steering device;
   a rear wheel installed at a rear end of the main body; and
   a cargo loading unit configured to be unfolded in a lateral direction from opposite sides of the main body to expand a loading region for loading a cargo in an unfolded state and configured to be folded toward the main body in a folded state, wherein the cargo loading unit comprises
   a plurality of expansion members having one end connected to a side surface of the main body and configured to be unfolded in the lateral direction of the main body; and
   a stopper configured to protrude upward from a free end of each of the expansion members in the unfolded state or to be accommodated in each of the expansion members in the folded state.

2. The personal mobility according to claim 1, wherein, for each of the expansion members, the one end is rotatably connected to the side surface of the main body, and wherein the expansion members are configured to be unfolded in the lateral direction of the main body by rotating and being spaced apart from each other in a longitudinal direction of the main body.

3. The personal mobility according to claim 1, wherein each of the expansion members comprises a magnet configured to be attached to the main body in the folded state.

4. The personal mobility according to claim 1, wherein:
   the front wheel comprises a first front wheel and a second front wheel installed side by side in a state in which rotation centers thereof coincide, wherein the first front wheel and the second front wheel are configured to be adjusted to approach or separate from each other in a width direction; and
   the steering device comprises:
      a steering shaft rotatably installed on the main body; and
      a wheel support device installed below the steering shaft to support the first front wheel and the second front wheel and configured to adjust an interval between the first front wheel and the second front wheel.

5. The personal mobility according to claim 4, wherein the wheel support device comprises:
   a sliding block coupled to a lower end of the steering shaft;
   a first sliding member and a second sliding member coupled to the sliding block and configured to move in the width direction of the front wheel and to move oppositely to opposite sides from the sliding block;
   a first wheel support member provided to support the first front wheel and coupled to the first sliding member;
   a second wheel support member provided to support the second front wheel and coupled to the second sliding member; and
   a wheel interval adjusting device configured to move the first wheel support member and the second wheel support member to adjust the interval between the first front wheel and the second front wheel.

6. The personal mobility according to claim 5, wherein the wheel interval adjusting device comprises:
   a first screw shaft fastened to the first wheel support member;
   a second screw shaft fastened to the second wheel support member and having a spiral direction opposite to that of the first screw shaft; and
   a driving unit configured to simultaneously rotate the first screw shaft and the second screw shaft.

7. A personal mobility comprising:
   a main body comprising a footrest on an upper surface of the main body;
   a steering device provided in front of the main body;
   a front wheel installed at a lower end of the steering device;
   a rear wheel installed at a rear end of the main body; and
   a cargo loading unit configured to be unfolded in a lateral direction from opposite sides of the main body to expand a loading region for loading a cargo in an unfolded state and configured to be folded toward the main body in a folded state, wherein the cargo loading unit comprises:
      a plurality of expansion members having one end rotatably connected to a side surface of the main body and configured to be unfolded in the lateral direction of the main body by rotating and disposed to be spaced apart from each other in a longitudinal direction of the main body; and
      a plurality of width expansion parts slidably coupled to the plurality of expansion members, respectively, wherein the width expansion parts are configured to expand a width of the expansion members in the lateral direction of the main body in the unfolded state.

8. A personal mobility comprising:
a main body comprising a footrest on an upper surface of the main body;
a steering device provided in front of the main body;
a front wheel installed at a lower end of the steering device;
a rear wheel installed at a rear end of the main body; and
a cargo loading unit configured to be unfolded in a lateral direction from opposite sides of the main body to expand a loading region for loading a cargo in an unfolded state and configured to be folded toward the main body in a folded state,
wherein the cargo loading unit comprises a plurality of expansion members having one end rotatably connected to a side surface of the main body and configured to be unfolded in the lateral direction of the main body by rotating and disposed to be spaced apart from each other in a longitudinal direction of the main body; and
wherein the main body comprises a plurality of accommodating grooves provided on opposite sides of the main body and configured to accommodate each of the expansion members in the folded state.

9. A personal mobility comprising:
a main body comprising a footrest on an upper surface of the main body;
a steering device provided in front of the main body;
a front wheel installed at a lower end of the steering device;
a rear wheel installed at a rear end of the main body; and
a cargo loading unit configured to be unfolded in a lateral direction from opposite sides of the main body to expand a loading region for loading a cargo in an unfolded state and configured to be folded toward the main body in a folded state,
wherein the cargo loading unit comprises a plurality of expansion plates rotatably connected to opposite side ends of the main body and configured to be folded by rotating from the opposite sides of the main body to cover the upper surface of the main body or to be unfolded by rotating from the opposite sides of the main body;
wherein each of the expansion plates comprises a stopper configured to protrude upward from a free end of the expansion plate in the unfolded state; and
wherein the main body comprises a stopper accommodating groove configured to accommodate the stoppers in the folded state.

10. The personal mobility according to claim 9, wherein the main body comprises an expansion plate loading surface provided lower than the footrest in a region where the expansion plates are placed so that surfaces of the expansion plates and a surface of the footrest are maintained at a same height in the folded state.

11. A personal mobility comprising:
a main body comprising a footrest on an upper surface of the main body;
a first front wheel and a second front wheel installed at a lower end of a steering device provided in front of the main body, the first front wheel and the second front wheel being configured to be adjusted to approach or separate from each other, wherein the steering device comprises:

a steering shaft rotatably installed on the main body; and
a wheel support device installed below the steering shaft to support the first front wheel and the second front wheel and configured to adjust an interval between the first front wheel and the second front wheel; and
a rear wheel installed at a rear end of the main body.

12. The personal mobility according to claim 11, wherein the wheel support device comprises:
a sliding block coupled to a lower end of the steering shaft;
a first sliding member and a second sliding member coupled to the sliding block and configured to move oppositely to opposite sides from the sliding block in a width direction of the first front wheel and the second front wheel;
a first wheel support member configured to rotatably support the first front wheel and coupled to the first sliding member;
a second wheel support member configured to rotatably support the second front wheel and coupled to the second sliding member; and
a wheel interval adjusting device configured to move the first wheel support member and the second wheel support member to adjust the interval between the first front wheel and the second front wheel.

13. The personal mobility according to claim 12, wherein the wheel interval adjusting device comprises:
a first screw shaft fastened to the first wheel support member;
a second screw shaft fastened to the second wheel support member and provided such that a spiral direction of the second screw shaft is opposite to that of the first screw shaft; and
a driving unit configured to simultaneously rotate the first screw shaft and the second screw shaft.

14. A personal mobility comprising:
a main body comprising a footrest on an upper surface of the main body;
a steering device provided in front of the main body, the steering device comprising a steering shaft and a wheel support device;
a first front wheel and a second front wheel installed side by side at a lower end of the steering device, wherein the first front wheel and the second front wheel are configured to be adjusted to approach or separate from each other in a width direction;
a rear wheel installed at a rear end of the main body; and
a cargo loading unit configured to be unfolded in a lateral direction from opposite sides of the main body to expand a loading region for loading a cargo in an unfolded state and configured to be folded toward the main body in a folded state.

15. The personal mobility according to claim 14, wherein the cargo loading unit comprises:
a plurality of expansion members having one end rotatably connected to a side surface of the main body and configured to be folded or unfolded in the lateral direction of the main body by rotating;
a stopper configured to protrude upward from a free end of each of the expansion members in the unfolded state or to be accommodated in each of the expansion members in the folded state; and
a plurality of width expansion parts slidably coupled to the plurality of expansion members, respectively, wherein the width expansion parts are configured to expand a width of the expansion members in the lateral direction of the main body in the unfolded state.

16. The personal mobility according to claim 14, wherein the cargo loading unit comprises a plurality of expansion plates rotatably connected to opposite side ends of the main body and configured to be folded by rotating from the opposite sides of the main body to cover the upper surface of the main body or to be unfolded by rotating from the opposite sides of the main body.

17. The personal mobility according to claim 14, wherein the cargo loading unit comprises a plurality of sliding expansion units configured to be unfolded in a sliding manner from the opposite sides of the main body in the lateral direction.

* * * * *